United States Patent [19]
Born

[11] 3,848,830
[45] Nov. 19, 1974

[54] MISSILE GUIDANCE SYSTEM
[75] Inventor: Gunthard Born, Munich, Germany
[73] Assignee: Messerschmitt-Bolkow-Blohm GmbH, Munich, Germany
[22] Filed: Nov. 16, 1972
[21] Appl. No.: 307,236

[30] Foreign Application Priority Data
Nov. 20, 1971 Germany.......................... 2157672

[52] U.S. Cl. ............................................ 244/3.16
[51] Int. Cl......... F41g 5/08, F41g 7/14, F41g 9/00
[58] Field of Search ................ 244/3.16; 102/70.2 P

[56] References Cited
UNITED STATES PATENTS
3,698,811 10/1972 Weil.................................. 244/3.16

Primary Examiner—Samuel Feinberg
Assistant Examiner—Thomas H. Webb
Attorney, Agent, or Firm—Woodhams, Blanchard and Flynn

[57] ABSTRACT

Missile guidance system utilizing laser beams. A beam is directed from a suitable source onto the missile and reflected by appropriate reflective means thereon directly back toward the source at which point it is received into a suitable optical system and caused to fall upon a position sensitive detector. Displacement of the beam on said detector from a predetermined zero point is appropriately interpreted and signals resultant therefrom are applied to a further laser generator. The modulation of said signals appears in the beam generated by said last-named generator, is directed in a sufficiently wide cone to cause it to fall upon the missile, is received therein and applied to a detector. Said detector appropriately interprets such beam and effects the necessary correction of the missile course to return it to the desired flight path. Appropriate filters are applied to the optical receiving means in both the control station and the missile to filter out stray light and insure both thereof being sensitive only to the desired laser beam.

6 Claims, 1 Drawing Figure

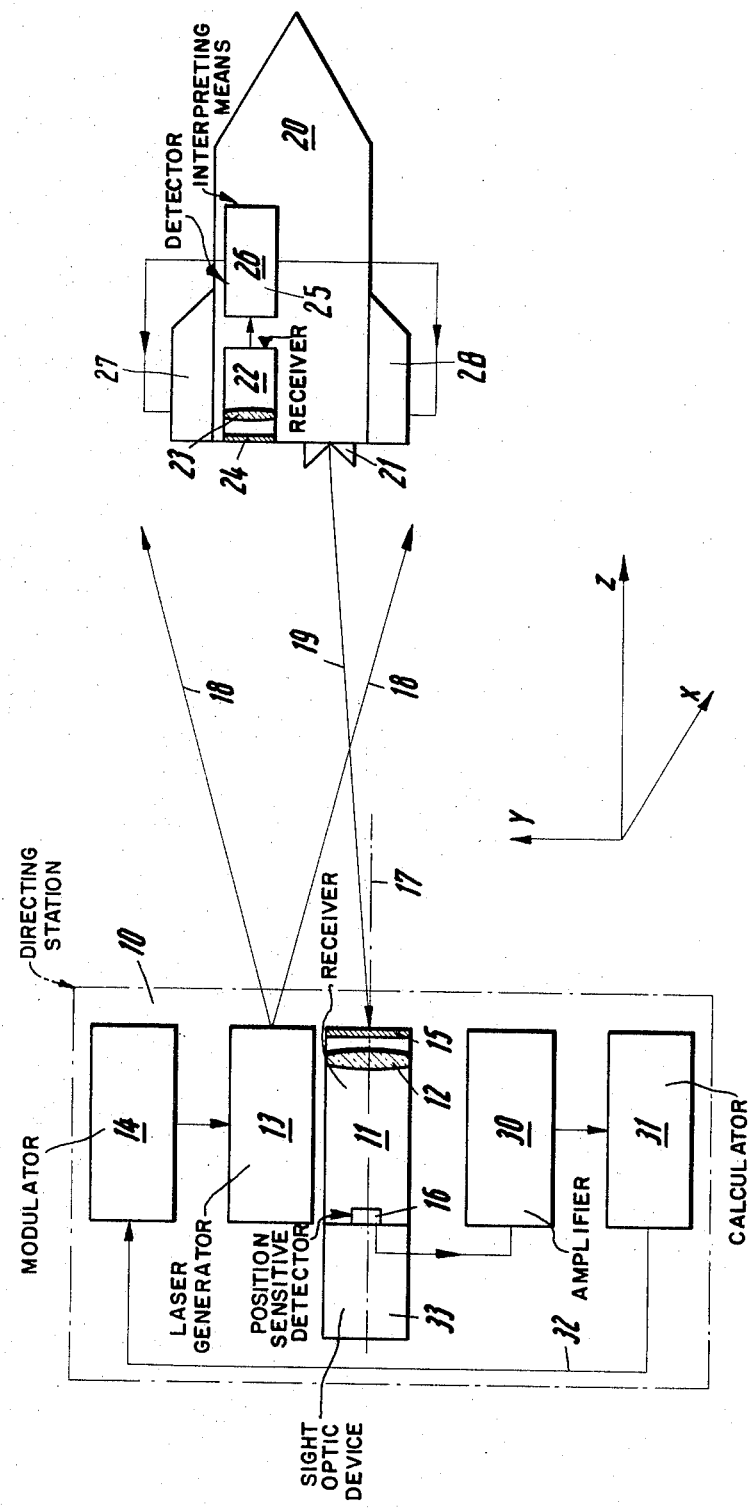

MISSILE GUIDANCE SYSTEM

FIELD OF THE INVENTION

The invention relates to an arrangement for guiding missiles along a line of sight.

BACKGROUND OF THE INVENTION

Arrangements of this general type are already known. Thus for example a missile is equipped with a backward flowing flare material which permits an optical location of the missile position from the free-control post. The angular displacement of the missile from the line of sight is determined for example by a goniometer in which there is usually applied the principle of mechanically modulating the radiation emitted from the missile. The guide signals calculated from the thus measured displacement are then usually transmitted from the directing station to the missile. Arrangements which operate according to this or a similar principle, have among others the disadvantage that the used goniometers so used, namely, those which operate by means of mechanical modulation of the beam, are expensive to manufacture because of the high mechanical precision required. In connection with the unmodulated flare material which emits radiation in a wide spectral range, the achievable angle accuracy is therefore limited as is also the available missile range.

The purpose of the invention is to overcome these disadvantages and to produce an arrangement for guiding missiles which permit a longer range and a higher speed of the missile with a substantially simplified construction of the control unit.

SUMMARY OF THE INVENTION

This purpose is attained by causing a receiver associated with the directing station to receive radiation from the missile, following which the receiver then focuses the beam onto a position-sensitive detector. In front of the receiver there is connected an objective with variable focal length, which objective varies the visual field of the receiver. Furthermore the invention includes arranging on the directing station a laser with a modulator and a variable transmitting device and on the missile a retroreflector together with a receiver, with the focusing optics of both the missile and of the directing station having connected in front of each thereof narrow band optic filters.

The invention will be described and illustrated hereinafter in connection with one exemplary embodiment, whereby the single embodiment of the missile quidance system is schematically illustrated in the drawing.

DETAILED DESCRIPTION

The directing station 10 is equipped with a laser generator 13 which illuminates the area around the line of sight 17 of a receiver 11 by a suitable transmitting cone. A gallium-arsenide-laser-diode or a yag-laser serves advantageously as the laser generator 13. Furthermore a modulator 14 is mounted on the directing station 10, with which modulator the laser beam is appropriately modulated for better discrimination against foreign light and for transmitting command controls to the missile 20. The missile is equipped at its rearward end with a receiver 22 for the laser radiation 18. This receiver 22 contains filter 24 transmitting an optically narrow band for transmission of the laser beams, and focusing optics 23 and a detector 25. A silicone diode is advantageously suitable as detector 25. Furthermore at the rearward end of the missile 20 there is arranged at least one retroreflector 21, as a three-surface mirror which reflects the striking laser beam back on itself, thus reflecting it accurately back to the directing station 10.

A receiver 11 is arranged at the directing station 10 for determining the angular displacement of the missile 20, in which receiver 11 the reflected beams 19 are focused after transmission through a narrow band filter 15 with an optical band width of $\Delta\zeta \leq 0.01$ to $0.001\ \mu$ through focusing optics 12 onto a position-sensitive detector 16. For this detector 16 again a Si-diode, for example of the type of the PIN-SC-series made by United Detector Technology of Santa Monica, Calif. 90404, is advantageously suitable. A diode of this type delivers two signals which are each proportional to the angular displacement of the missile 20 from the line of sight 17 in the x- and y-direction. These signals are amplified in an amplifier 30. From this by means of a calculator 31 the guide signals 32 are calculated and transmitted by means of the laser modulator 14 as the modulated laser beam 18 onto the missile 20.

To increase the laser output on the missile 20 it is further provided that the transmitting cone 18 of the laser 13 is reduced progressively through one or more steps with increasing distance of the missile 20 from the directing station 10. At the same time for increasing the precision of angular measurement the visual field of the receiving optics 12 is reduced at the directing station 10.

A sight optic device 33 with suitable cross hairs is coupled with the receiver 11 at the directing station 10, the line of sight of which is controlled with a high level of accuracy to be parallel with the line of sight 17 of the receiver 11. The axis of symmetry of the laser transmitting cone 18 is also aligned parallel with this line of sight 17, though it can be so with less exactness.

OPERATION

With this arrangement the following function of the missile system 20 is obtained:

The directing station 10 is adjusted to the target by means of the sight optic device 33. The missile 20 which is started near the directing station 10 flies into the transmitting cone 18 of the laser 13 and reflects by means of the retroreflector 21 the laser light into the receiver 11 of the directing station 10. From the illumination of the position-sensitive diode 16 there is indicated the angular displacement of the missile 20, from the desired line of flight. From this signal, the guide signals are calculated at the directing station 10 by means of the calculator 31 and are transmitted over a line 32 to a modulator 14 to cause a modulated signal to be imposed on the laser beam 18. These modulated laser signals are received by the receiver 22 on the missile 20 and are transmitted to the amplifier 25 and effect a control of the missile 20 in a direction toward the line of sight 17. For example, the output of the amplifier 25 may be fed into suitable conventional interpreting means 26 the output of which in turn is fed to the rocket units 27 and 28 for controlling same in any conventional manner to cause the required course correction.

Compared with the conventional missile guide systems, the afore-described arrangement is distinguished in that on the one hand the determination of the angular displacement of the missile is made by means of position-sensitive diodes and hence no longer requires any mechanically movable parts. This permits therefore a simple manufacturing technique and provides a simple electronic adjusting of the axis of symmetry. On the other hand the afore-described arrangement is distinguished advantageously in that by the use of a laser in connection with the receiver at the directing station a long range and high flying speed of the missile is permitted.

The embodiments of the invention in which exclusive property or privilege is claimed are defined as follows:

1. A missile guidance system, comprising:
   a transmitting station having means defining a laser adapted to transmit a guidance electromagnetic radiation signal to a zone spaced from said transmitting station;
   means comprising a missile and propulsion means for propelling said missile to and into said zone, said missile means including guidance signal receiving means responsive to said guidance signal for controlling the movement of said missile while in said zone;
   means comprising a source of a location electromagnetic radiation signal on said missile means which is adapted to transmit same rearwardly thereof;
   a receiving station located adjacent said transmitting station and having means defining a location electromagnetic radiation signal receiver for said location electromagnetic radiation signal from said missile, said location electromagnetic radiation signal receiver means including means for locating said missile means in said zone and producing said guidance signal in response to said location electromagnetic radiation signal.

2. A missile guidance system according to claim 1, wherein said transmitting station includes modulation means for modulating said guidance signal on said electromagnetic radiation from said laser in said transmitting station.

3. A missile guidance system according to claim 2, wherein said transmitting and receiving stations combined include means defining a sight optic device for defining a theoretical line of sight into said zone illuminated by electromagnetic radiation from said laser at said transmitting station, calculator means responsive to said location signal for determining the angle between said line of sight and location of said missile means, said calculator means being adapted to produce said guidance signal proportional to said angle determination and signal connection means for connecting said modulation means to said calculator means, said modulation means being responsive to said guidance signal from said calculator means to modulate said guidance signal on said electromagnetic radiation from said laser in said transmitting station to effect a control of said missile means to move same toward said line of sight.

4. A missile guidance system according to claim 1, wherein said source means of a location electromagnetic radiation signal on said missile is defined by a mirror mounted on the aft end of said missile means which is adapted to reflect electromagnetic radiation from said transmitting station rearwardly of said missile means.

5. A missile guidance system according to claim 1, wherein said location electromagnetic radiation signal receiver means includes a position sensitive detector means.

6. A missile guidance system according to claim 1, wherein said guidance signal receiving means includes interpreting means for interpreting said guidance signal and effecting a control of said propulsion means and the direction of flight of said missile means.

* * * * *